Aug. 14, 1928.  
W. C. WHITE  
FLUID CONVEYING APPARATUS  
Filed June 24, 1924  
1,680,831  
2 Sheets-Sheet 2
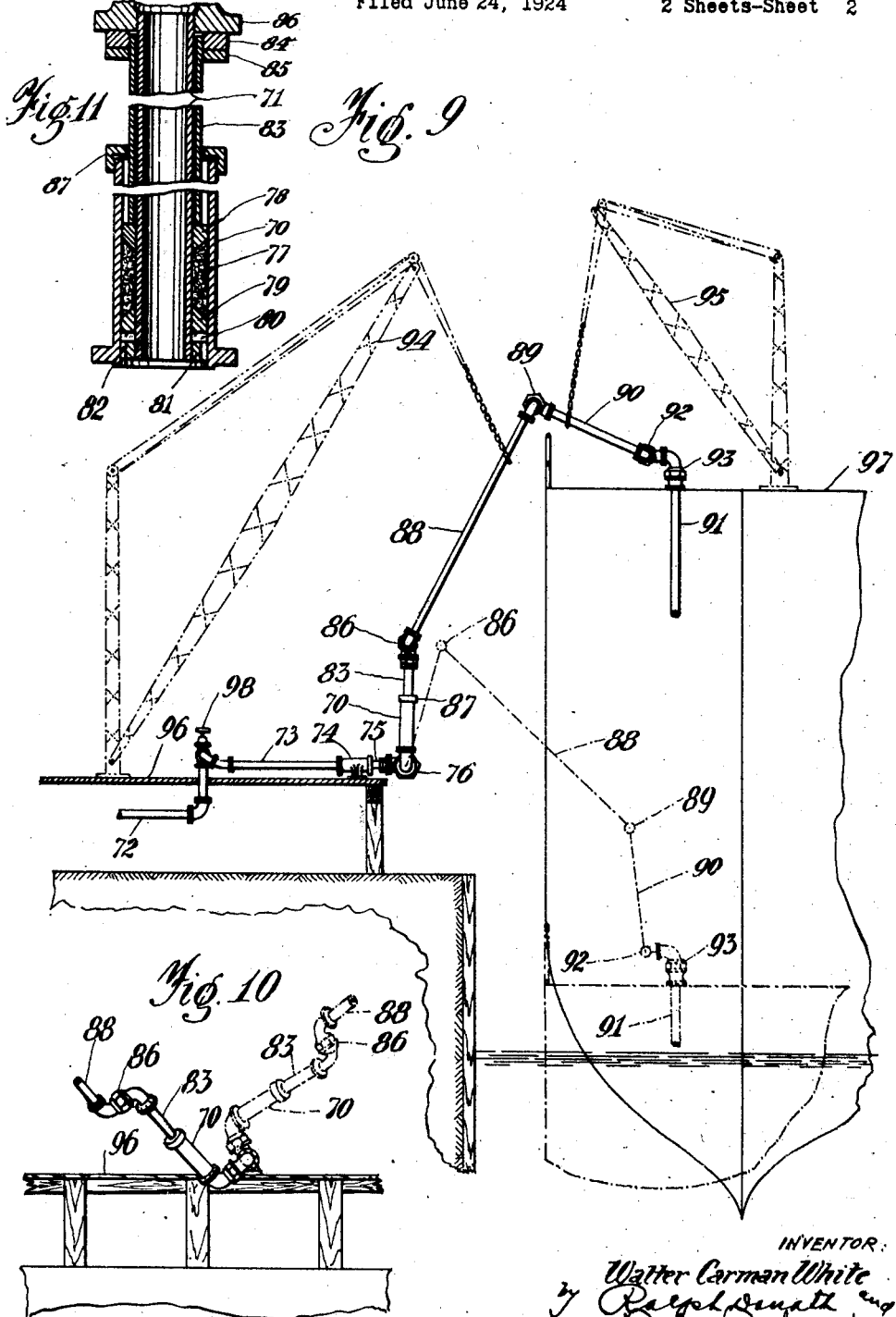
INVENTOR:  
Walter Carman White  
by Ralph Senath and  
Paul Burchard  
Attorneys.

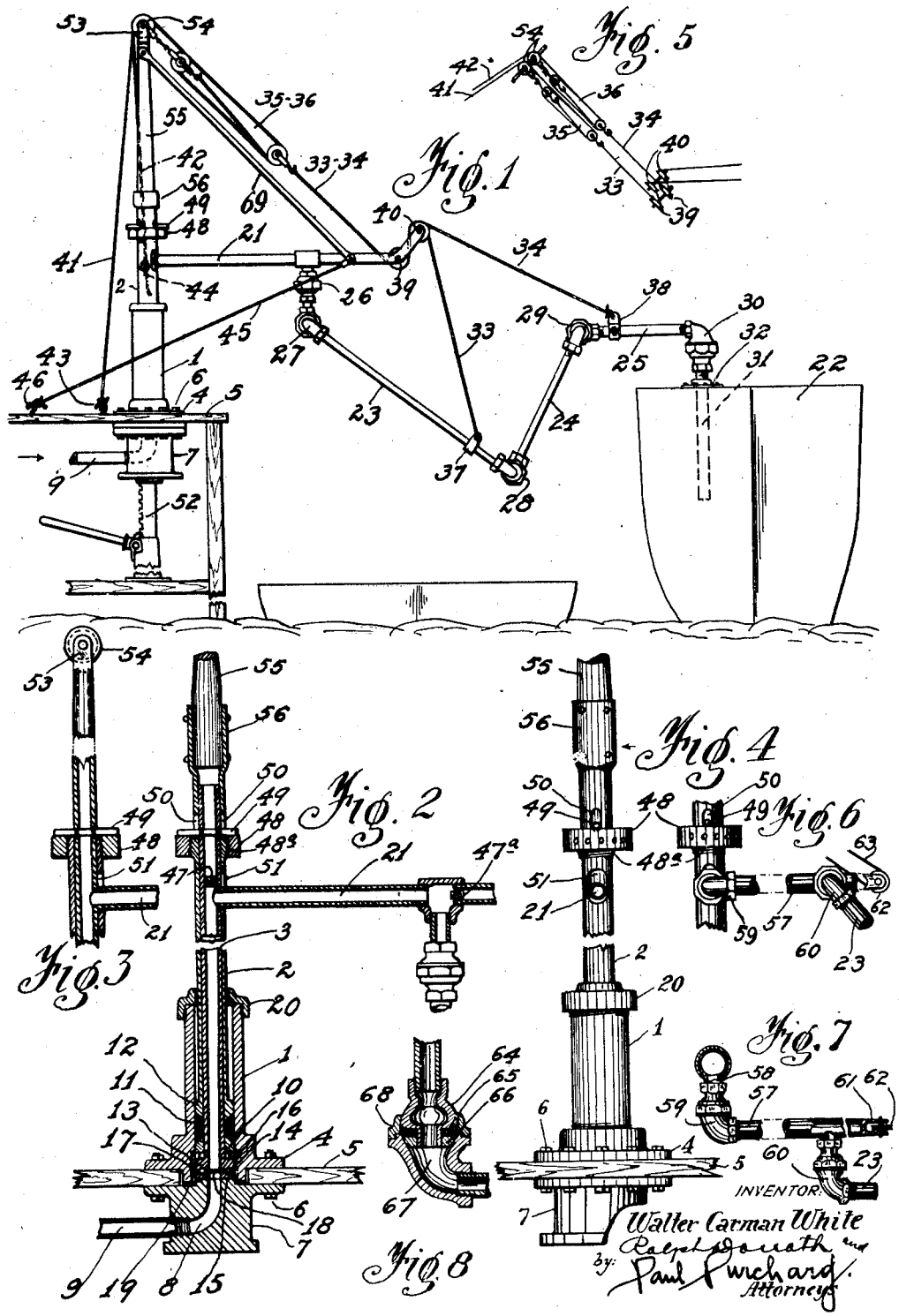

Patented Aug. 14, 1928.

1,680,831

UNITED STATES PATENT OFFICE.

WALTER CARMAN WHITE, OF PITTSBURGH, PENNSYLVANIA.

FLUID-CONVEYING APPARATUS.

Application filed June 24, 1924. Serial No. 722,000.

This invention relates to fluid conveying devices and more in particular to apparatuses intended for loading or unloading oil in ships.

One of the main objects of this invention is to provide an apparatus whereby the use of fast deteriorating rubber hose to load ships with oil, or unload said oil, may be replaced by durable metallic piping having the necessary flexibility required for such purposes. Another object is to provide an apparatus permitting the use of very much greater working pressures for conveying oil than allowable with rubber hose, thereby greatly reducing the time required for loading or unloading a given amount of oil. A further object is to provide an apparatus wherein all flexible joints used in connection therewith are substantially self-sealing under all conditions of pressure prevailing in the conveyed liquid. Still another object is to devise an apparatus built substantially along the lines of a boom-derrick, in which the derrick-pole, or mast, and the boom are used to convey the fluid. Still a further object is to provide an apparatus in which the renewal of packing in the derrick-pole may be performed rapidly and with the minimum of trouble. Additional features and advantages of this invention will appear from the following description considered in connection with the accompanying drawings, in which:

Fig. 1 is a general view showing the apparatus in position for loading, or unloading, an oil carrying ship.

Fig. 2 is a partial cross-sectional elevation through the apparatus shown in Fig. 1.

Fig. 3 is a fractional cross-section showing a modified construction of the apparatus.

Fig. 4 is a side elevation of Fig. 2.

Fig. 5 is a detail view illustrating the arrangement of the blocks and tackles also shown in Fig. 1.

Fig. 6 is a fragmentary side view of a modified construction showing a tubular adjustable arm, or boom, used in my invention.

Fig. 7 is a top plan view of Fig. 6.

Fig. 8 is a cross-section through one of the flexible joints used in connection with my apparatus.

Fig. 9 is a general view showing another modification of my apparatus in position for loading or unloading an oil carrying ship.

Fig. 10 is a fragmentary front elevation of the tiltable column, or mast, used in Fig. 9, showing said mast in two arbitrary positions.

Fig. 11 is a fractional view showing a cross-section through the mast and supply tube of this modified construction.

Referring to the various figures, my apparatus consists of a vertical column 1 centrally bored to slidably receive the tubular pole 2 within which is located the supply tube 3 longitudinally adjustable therein. The column is provided at the bottom with the flanged base 4 whereby it is secured to the floor 5 by means of bolts 6. The latter also serves as holding means for the base-cap 7 in which is provided the inlet aperture 8 properly tapped at its outer end to receive the oil-supply line 9, landing to any desired supply tank or pump (not shown).

In order to properly direct the flow of oil and to prevent leakage thereof, a stuffing box comprising a follower-ring 10, the packing 11 and the bevelled shoulder 12 located at the lower end of the tubular pole 2 is introduced between the column and the outside of the supply-tube. The latter is furnished at its bottom end with a flange 13 which serves as a ball-race for the ball-thrust-bearing 14, the lower ball-race of which rests upon a short hub 15 machined on the base-cap 7. The follower-ring 10 is provided at its lower end with suitable and evenly spaced lugs 16 to enable the oil under pressure to act uniformly upon the former. For the same purpose, lateral grooves 17 are cut in the bore of the column, thus allowing the oil to pass through the open spaces 18, between the ball-races and act upon the follower-rings freely. A gasket 19 is inserted between the base-cut and the foot of the column to make the connection between these parts oil-tight. The top of the column is closed by a threaded cap 20 which acts as a guide and limit-stop for the tubular pole, while at the same time preventing the entrance of dirt in the column.

Connected at right angles to the supply tube and supported by a brace 69 is the tubular arm, or boom, 21 through which the oil is transferred to the ship 22 by means of the tubular link-members 23, 24 and 25, the straight flexible pipe joint 26, the double elbow flexible pipe joints 27, 28, 29 and the single elbow flexible pipe joint 30. The latter is connected to the ship filling tube 31 which is removably mounted on the deck of the ship and secured thereon in a flange 32 provided on the ship.

The manipulation of the tubular links is effected by means of the cables 33 and 34 connected to the block and tackle apparatuses 35 and 36 and secured respectively to the tubular links 23 and 25 by means of the clamps 37 and 38. Suitable sheaves 39 and 40 are mounted on the end of the boom 21 to guide these cables. The blocks and tackles, in turn, are operated by the pull-ropes 41 and 42, the free ends of which are tied, after proper adjustment of the links has been attained, to any suitable stationary anchoring means, such as the hook 43 or the cleat 44.

Similarly, the desired angular position of the boom in an horizontal plane is maintained by means of guy-ropes 45, the lower ends of which are tied to anchor-hooks 46.

As shown in Fig. 2, suitable plugs 47 and 47ª are inserted respectively in the supply-tube and the boom to properly direct or limit the flow of oil.

The compression in the stuffing box may be varied by means of an adjusting nut 48 engaging suitable threads 48ª cut outwardly on the upper end of the tubular pole, said nut acting upon a cross-pin 49 secured in the supply-tube. As will be noted in Fig. 2, when the nut is raised, it will cause the cross-pin to lift the whole supply tube within the tubular-pole, thus compressing the packing in the stuffing box. In order to take care of this relative longitudinal movement between the supply-tube and the tubular pole, the latter is provided with elongated apertures 50 and 51 to accommodate respectively the cross-pin and the tubular-boom.

For the purpose of renewing the packing of the stuffing box, a lifting jack 52, of any suitable and desired type, is placed underneath the base-cap, the bolts 6 are removed and the base-cap slowly lowered until the packing is fully exposed to enable the mechanic to wrap new packing material around the supply-tube. This done, the cap and tubes are again raised into position and the bolts properly tightened.

In Fig. 3 is shown a modified construction which consists in extending the supply-tube a sufficient amount to serve as the derrick-pole. The upper end of the tube is closed up and is provided with the bifurcated support 53 between which are rotatably mounted the pull-rope sheaves 54. This modification, therefore, eliminates the wooden pole 55 which is inserted in the widened end 56 of the tubular pole 2, shown in Figs. 1, 2 and 4.

In the constructions so far described, the tubular boom 21 is fixedly connected to the supply tube. In Figs. 6 and 7 is illustrated a vertically adjustable hinged boom 57 which is connected to the supply-tube by means of a short nipple 58, welded or otherwise secured thereon, and the single elbow flexible pipe-joint 59 connecting said nipple with the tubular boom. The latter is also provided with another single elbow flexible pipe-joint 60 to which the first tubular link 23 is connected. The boom is closed at its outer end and is provided with a forked support 61 between which is mounted the sheave 62 engaged by the rope 63 of a block and tackle set (not shown), whereby the angular position of the boom in a vertical plane may be varied.

Fig. 8 shows in detail the construction of the flexible pipe-joints preferably used in the apparatus, and which form the subject matter of prior letters patent issued to myself. Referring to this figure, the single elbow flexible pipe joint represented thereby comprises a sleeve hemisphere 64, a gasket 65, a follower 66 and a socket-cup 67 securely held together by the threaded socket-nut 68.

In the modified construction shown in Figs. 9 to 11, the column 70 and the supply-tube 71 are so mounted as to be tiltable in all directions to accommodate all possible variations in the location of ships. This is done by providing on the supply line 72 the horizontal pipe section 73 carried adjacent the water-front in an expansion sleeve-coupling 74, of usual construction, which permits the rotation of the short nipple 75 to rotate on its axis. At the forward end of this short pipe is secured the socket-cup portion of the double elbow flexible joint 76, whereas the sleeve hemisphere of said joint is fastened in any desired manner to the column 70.

It will be seen in Fig. 11 that the supply tube 71 is slidably mounted within the column 70 and that this connection is made water tight by means of a stuffing-box arrangement consisting of the packing 77 compressed between an upper bevelled follower 78 and a lower follower 79 provided with the spacer lugs 80 resting upon a plunger 81 screwed on the lower end of the supply tube. This plunger is provided with outward grooves 82 to permit the liquid under pressure to act against the lower follower, thereby assisting in compressing the packing and insuring a tight connection.

Additional adjustment of the packing, from the outside, is obtained by means of the pipe 83 surrounding the supply-tube and resting on the top follower 78. The upper end of said pipe is screwed into the threaded nut 84 and the lock-nut 85, the former bearing against the underside of the double elbow-flexible joint 86 secured at the upper end of the supply tube 71. It will be seen that by turning the nut 84 in the proper direction, the pipe 83 may be forced downwardly upon the upper follower until the desired pressure on the packing is obtained and locked in this position by means of the lock-nut 85.

The outward movement of the supply tube is limited by means of the threaded cap 87 engaging the upper end of the column 70, said cap also preventing the entrance of foreign matter within the column.

Secured to the flexible joint 86 is the first tubular link member, or boom, 88 at the upper end of which is connected by means of the double elbow flexible joint 89 the second tubular link member 90. The latter is, in turn, secured to the filling tube 91 by means of the double elbow flexible joint 92 and the union elbow 93.

The first and second tubular link members are individually manipulated by the derricks 94 and 95; the former being erected on the dock 96 and the latter forming part of the equipment of the ship 97. A valve 98 is also shown in Fig. 9 to control the flow of the liquid fuel through the apparatus.

Assisted by the foregoing description and the drawings, the method of operating my apparatus will be readily understood without requiring detailed description. Suffices to say that in the apparatus shown in Fig. 1, for instance, the position of the various tubular-links 23, 24 and 25 is adjusted by means of the blocks and tackles to accommodate the variations in the level of the ship, due to the load or tide. The single elbow flexible pipe joint 30 is then connected to the filling tube 31 and the supply valve (not shown), connecting the apparatus to the supply tank is then opened to permit the fluid to flow into the ship. It will be noted that the minor movements of the ship, due to waves or other causes, will be readily taken care of by the flexibly connected tubular-links. Greater movements of the ship are dealt with by means of the blocks and tackles commanding said tubular links. Referring also to Fig. 2, it will be seen that the sealing effect of the stuffing box is greatly assisted by the weight of the tubular mast and the other parts carried thereby.

As will be understood, as suggested herein, there may be slight changes made in the construction and arrangement of the details of my invention without departing from the field and scope of the same, and I intend to include all such variations, as fall within the sphere of the appended claims, in this application in which the preferred forms only of my invention have been disclosed.

What I claim is:—

1. In a fluid conveying apparatus, a centrally apertured vertical guide-sleeve; means for securing same to a stationary foundation; a base-cap positioned below said guide-sleeve and adapted to close the lower end thereof; a tubular mast guided by said sleeve for rotative and longitudinal movement; packing means positioned at the lower end of said mast; adjustable supporting means adapted to lower said base-cap and expose said packing below said guide-sleeve; a tubular boom connected to said mast; a supply line connected to said base-cap; said base cap, mast and boom being jointly adapted to convey therethrough fluids carried by said supply-line.

2. In a fluid conveying apparatus, a centrally apertured vertical guide-sleeve; means for securing same to a stationary foundation; a tubular mast comprising an outer tube and an inner tube slidable therein and having a flange at its lower end; packing means positioned around said inner tube and on said flange and adapted to be compressed by the weight of said outer tube; a tubular boom connected to said inner tube; said inner tube and boom being jointly adapted to convey fluids therethrough.

3. In a fluid conveying apparatus, a centrally apertured vertical guide-sleeve; means for securing same to a stationary foundation; a base-cap positioned below said guide-sleeve and adapted to close the lower end thereof; a tubular mast guided by said sleeve for rotative and longitudinal movement; packing means positioned at the lower end of said mast; means to regulate the compression on said packing; a supply line connected to said base-cap; adjustable supporting means adapted to lower said base-cap and expose thereby said packing below said guide-sleeve; a tubular boom connected to said mast; said base-cap; mast and boom being jointly adapted to convey therethrough fluids carried by said supply line.

4. In a fluid conveying apparatus, a centrally apertured vertical guide-sleeve; means for securing same to a stationary foundation; a base-cap positioned below said guide-sleeve and adapted to close the lower end thereof; a tubular mast guided by said sleeve for rotation and longitudinal movement; a supply-tube positioned within said mast; packing means surrounding the supply-tube and positioned adjacent the lower ends of said mast and supply-tube; a supply-line connected to said base-cap; adjustable supporting means adapted to lower said base-cap and expose thereby said packing below said guide-sleeve; a tubular boom connected to said supply-tube, and means adapted to produce relative longitudinal movement between said mast and supply-tube for varying the pressure on said packing means; said base-cap, supply-tube and boom being jointly adapted to convey therethrough fluids carried by said supply-line.

5. In a fluid conveying apparatus, a centrally apertured vertical guide-sleeve; means for securing the same to a stationary foundation; a base-cap positioned below said guide-sleeve and adapted to close the lower end thereof; a tubular mast guided by said sleeve for rotation and longitudinal movement, said mast having threads cut adjacent the upper end thereof; a supply tube positioned within said mast for longitudinal movement therein; packing means surrounding the supply tube and positioned adjacent the lower ends of said mast and supply tube; a nut positioned on the threaded portion of the mast and a stop positioned on said supply-tube adapted to be engaged by said nut whereby the pressure on the packing means may be increased by forcing said nut against said stop; said base-cap, supply-tube and boom being jointly adapted to convey therethrough fluids carried by said supply-line.

6. In a fluid conveying apparatus, a centrally apertured vertical guide-sleeve; means for securing the same to a stationary foundation; a base-cap positioned below said guide-sleeve and adapted to close the lower end thereof; a tubular mast guided by said sleeve for rotation and longitudinal movement, said mast having threads cut adjacent the upper end thereof; a supply-tube positioned within said mast for longitudinal movement therein; packing means surrounding the supply-tube and positioned adjacent the lower ends of said mast and supply-tube; a nut positioned on the threaded portion of the mast, and a stop positioned on said supply-tube adapted to be engaged by said nut whereby the pressure on the packing means may be increased by forcing said nut against said stop; means positioned on said mast to provide clearance-space for the vertical movement of said boom; said base-cap, supply-tube and boom being jointly adapted to convey therethrough fluids carried by said supply-line.

7. In a fluid conveying apparatus, a centrally apertured vertical guide-sleeve; means for securing the same to a stationary foundation; a base-cap positioned below said guide-sleeve and adapted to close the lower end thereof; a tubular mast guided by said sleeve for rotation and longitudinal movement, said mast having threads cut adjacent the upper end thereof; a supply-tube positioned within said mast for longitudinal movement therein; packing means surrounding the supply-tube and positioned adjacent the lower ends of said mast and supply-tube; a nut positioned on the threaded portion of the mast and a stop positioned on said supply-tube adapted to be engaged by said nut whereby the pressure on the packing means may be increased by forcing said nut against said stop; said mast having an aperture adapted to be engaged by said boom to provide clearance for the vertical travel thereof; said base-cap; supply-tube and boom being jointly adapted to convey therethrough fluids carried by said supply-line.

In testimony whereof I affix my signature.

WALTER CARMAN WHITE.